(12) United States Patent
Chevalier

(10) Patent No.: US 9,081,934 B2
(45) Date of Patent: Jul. 14, 2015

(54) SYSTEM AND METHOD FOR COLLABORATIVE BUILDING OF A SURROGATE MODEL FOR ENGINEERING SIMULATIONS IN A NETWORKED ENVIRONMENT

(75) Inventor: Thierry Chevalier, Toulouse (FR)

(73) Assignee: AIRBUS ENGINEERING CENTRE INDIA, Banglore, Karnataka (IN)

( * ) Notice: Subject to any disclaimer, the term of this patent is extended or adjusted under 35 U.S.C. 154(b) by 613 days.

(21) Appl. No.: 13/264,990

(22) PCT Filed: Apr. 27, 2010

(86) PCT No.: PCT/EP2010/055652
§ 371 (c)(1),
(2), (4) Date: Oct. 18, 2011

(87) PCT Pub. No.: WO2010/127966
PCT Pub. Date: Nov. 11, 2010

(65) Prior Publication Data
US 2012/0041734 A1 Feb. 16, 2012

(30) Foreign Application Priority Data
May 4, 2009 (IN) .......................... 1030/CHE/2009

(51) Int. Cl.
*G06G 7/50* (2006.01)
*G06G 7/57* (2006.01)
(Continued)

(52) U.S. Cl.
CPC ............ *G06F 17/5095* (2013.01); *G05B 17/02* (2013.01); *G06F 17/5086* (2013.01); *G06F 17/5009* (2013.01)

(58) Field of Classification Search
CPC ................ G05B 17/00–17/02; G06F 17/5009; G06F 17/5086; G06F 17/5095; G06F 2217/08; G06N 3/126; G06N 3/0454
USPC .......................................................... 703/8
See application file for complete search history.

(56) References Cited

U.S. PATENT DOCUMENTS 6,227,809 B1 *  5/2001 Forster et al. ................... 417/53
7,069,192 B1    6/2006 Freitag
(Continued)

OTHER PUBLICATIONS

Mouton et al, "Aerodynamic and Structural Optimization of Powerplant Integration under the Wing of a Transonic Transport Aircraft", 42eme' colloque d'Aerodynamique Appliquee AAAF, Mar. 19-21, 2007.*

(Continued)

*Primary Examiner* — Mary C Jacob
(74) *Attorney, Agent, or Firm* — Prakash Nama; Global IP Services, PLLC

(57) ABSTRACT

A system and method for collaborative building of a shared self-refining surrogate model for engineering simulations are disclosed. In one embodiment, a method includes running a reduced order engineering simulation model on a complex system, and querying a shared self-refining surrogate model upon receiving a request for a higher order simulation for a reduced order simulated item. The method also includes estimating a required higher order simulation result having a desired confidence interval for the reduced order simulated item, and determining whether the required higher order simulation result having the desired confidence interval is in the shared self-refining surrogate model. If not, then the method includes performing the higher order simulation to obtain the required higher order simulation result, enriching the shared self-refining surrogate model with the obtained higher order simulation result, and sending the obtained higher order simulation result to the reduced order engineering simulation model.

17 Claims, 4 Drawing Sheets

(51) Int. Cl.
G06G 7/70 (2006.01)
G06F 17/50 (2006.01)
G05B 17/02 (2006.01)

(56) References Cited

U.S. PATENT DOCUMENTS

| | | | |
|---|---|---|---|
| 7,313,503 B2 * | 12/2007 | Nakagawa et al. | 703/1 |
| 7,480,640 B1 * | 1/2009 | Elad et al. | 706/14 |
| 8,006,220 B2 * | 8/2011 | McConaghy et al. | 716/132 |
| 8,041,545 B2 * | 10/2011 | Sevastyanov et al. | 703/2 |
| 8,065,244 B2 * | 11/2011 | Chen et al. | 706/15 |
| 8,539,408 B1 * | 9/2013 | Cheng et al. | 716/110 |
| 8,600,534 B2 * | 12/2013 | Holden et al. | 700/97 |
| 2003/0090530 A1 | 5/2003 | Ramani et al. | |
| 2005/0240612 A1 * | 10/2005 | Holden et al. | 707/102 |
| 2006/0212279 A1 * | 9/2006 | Goldberg et al. | 703/2 |
| 2008/0177518 A1 * | 7/2008 | Krishnamoorthy et al. | 703/9 |
| 2011/0024125 A1 * | 2/2011 | Wallace et al. | 166/369 |
| 2011/0093243 A1 * | 4/2011 | Tawhai et al. | 703/2 |
| 2011/0178789 A1 * | 7/2011 | Miranda et al. | 703/16 |

OTHER PUBLICATIONS

Quiepo et al, "Surrogate-based Analysis and Optimization", Progress in Aerospace Sciences 41, pp. 1-28, 2005.*
Ong et al, "Evolutionary Optimization of Computationally Expensive Problems via Surrogate Modeling", AIAA Journal, vol. 41, No. 4, Apr. 2003.*
Casanova et al, "NetSolve: A Network Server for Solving Computational Science Problems", University of Tennessee, Technical Report No. cs-95-313, 1995.*
Ng et al, "OPTIMISE: An Internet-Based Platform of Metamodel-Assisted Simulation Optimization", Advances in Communication Systems and Electrical Engineering, Chapter 20, Springer 2008.*
Forrester et al, "Optimization using Surrogate Models and Partially Converged Computational Fluid Dynamics Simulations", Proceedings of the Royal Society, 462, pp. 2177-2204, 2006.*
Cheng et al, "Simplified Space-Mapping Approach to Enhancement of Microwave Device Models", Wiley InterScience, 2006.*
Gorissen et al, "Adaptive Distributed Metamodeling", VECPAR 2006, LNCS 4395, pp. 579-588, 2007.*
LeDoux et al, "MDOPT-A Multidisciplinary Design Optimization System using Higher Order Analysis Codes", 10th AIA/ISSMO Multidisciplinary Analysis and Optimization Conference, Sep. 2004.*
Bassett et al, "Calculation of Steady Flow Pressure Loss Coefficients for Pipe Junctions", Journal of Mechanical Engineering Science, vol. 215, 2001.*
Han et al, "On Improving Efficiency and Accuracy of Variable-Fidelity Surrogate Modeling in Areo-Data for Loads Context", Proceedings of European Air and Space Conference, 2009.*
Kesgin, Ugur, "Study on the Design of Inlet and Exhaust System of a Stationary Internal Combustion Engine", Energy Conversion and Management, 46, pp. 2258-2287, 2005.*
Kiser et al, "Reynolds Number Dependence for Laminar Flow Loss Coefficients in Tee and Wye Junctions", Proceedings of the ASME 2010 3rd Joint US-European Fluids Engineering Summer Meeting and 8th International Conference on Nanochannels, Microchannels and Minichannels, Aug. 1-5, 2010.*
Le Moinge et al, "Variable-Fidelity Aerodynamic Optimization for Turbulent Flows Using a Discrete Adjoint Formulation", AIAA Journal, vol. 42, No. 7, Jul. 2004.*
Paal et al, "The Effect of Corner Radius on the Energy Loss in 90° T-Junction Turbulent Flows", Conference on Modelling Fluid Flow, The 13th International Conference on Fluid Flow Technologies, Sep. 6-9, 2006.*
Castro et al, "Developing a Computationally Efficient Dynamic Multilevel Hybrid Optimization Scheme Using Multifidelity Model Interactions", Sandia National Laboratories, SAND2005-7498, Jan. 2006.*
Vasava, Paritosh, "Fluid Flow in T-Junction of Pipes", Lappeenranta University of Technology, Nov. 18, 2007.*
W.D.Li et al., "Feature-based design in a distributed and collaborative environment" Computer-Aided Design 36, 775-797, 2004.

* cited by examiner

SYSTEM AND METHOD FOR COLLABORATIVE BUILDING OF A SURROGATE MODEL FOR ENGINEERING SIMULATIONS IN A NETWORKED ENVIRONMENT

FIELD OF TECHNOLOGY

The present invention relates generally to engineering simulations, and more particularly relates to a self-refining surrogate model for engineering simulations in a networked environment.

BACKGROUND

Typically, complex system simulations are performed using two levels of simulation to reduce computing time and cost. For example, in an aircraft fuel system that includes a large number of T-junctions having varying flow conditions, geometrical configurations and so on, the simulation to study the behavior of the T-junctions can be a very time consuming process. Such simulations are generally performed using two levels of simulation. The first level includes performing the simulations using simple simulation techniques.

For example, the first level simulation can include performing the simulation of the entire aircraft fuel system except for the T-junction configurations using a one-dimensional (1D) simulation. For the T-junction components, 1D simulation results may not be very accurate, so a second level simulation is performed. This second level simulation includes usage of a look-up table to provide results of a typical three-dimensional (3D) T-junction simulation or directly performing of a complete 3D simulation, which may not be cost-effective, as they can be very time consuming and expensive to keep 3D simulation package licenses.

Generally, the second level simulation includes using a local look-up table file to determine a type of T-junction geometry and/or a type of flow condition requested by the 1D simulation during the convergence process. For example, during the convergence of the 1D simulation, a large number of flow conditions may be tried by a 1D solver, for which look-up may happen to obtain the T-junction 3D simulation result. However, if the requested T-junction geometry and/or the flow condition are not available in the local look-up table file then, the 1D simulation may stop or poorly interpolate leading to lack of robustness and accuracy of the computation.

In such a scenario, a localized self-refining surrogate model is used to provide continuous interpolation across tabulated data, and to capitalize on previously performed 3D simulations of T-junctions where the 1D simulation of the T-junctions lacks robustness and accuracy (as shown in FIG. 1). However, using the localized self-refining surrogate model, one cannot take advantage of any previously performed 3D simulations of T-junctions in various aircraft programs by others. This can result in re-computing and redoing the 3D simulations, which may result in a time consuming process.

SUMMARY

A system and method for collaborative building of a surrogate model, on an as needed basis, for engineering simulations in a networked environment is disclosed. According to an aspect of the present invention, a method for collaborative building a shared self-refining surrogate model for engineering simulations in a computer network includes running a reduced order engineering simulation model on a complex system (e.g., a manageable network of aircraft component) to simulate one or more simulation items in the complex system by a user on a client device connected to the computer network. The method also includes querying the shared self-refining surrogate model via the computer network upon receiving a request for a higher order simulation for a reduced order simulated item. The method further includes estimating a required higher order simulation result having a desired confidence interval for the reduced order simulated item using the shared self-refining surrogate model.

Further, the method includes determining whether the required higher order simulation result having the desired confidence interval for the reduced order simulated item is in the shared self-refining surrogate model. If it is determined not, the method includes performing the higher order simulation to obtain the required higher order simulation result having the desired confidence interval for the reduced order simulated item. Further, the method includes enriching the shared self-refining surrogate model with the obtained higher order simulation result, and sending the obtained higher order simulation result to the reduced order engineering simulation model. If it is determined so, the method includes obtaining the required higher order simulation result having the desired confidence interval from the shared self-refining surrogate model, and sending the obtained higher order simulation result to the reduced order engineering simulation model.

According to another aspect of the present invention, an article including a storage medium having instructions, that when executed by a computing platform, result in execution of a method for collaborative building a shared self-refining surrogate model for engineering simulations in a computer network. The storage medium has instructions to run a reduced order engineering simulation model on a complex system to simulate one or more simulation items in the complex system by a user on a client device connected to the computer network.

Further, the storage medium has instructions to query the shared self-refining surrogate model via the computer network upon receiving a request for a higher order simulation for a reduced order simulated item. The storage medium also has instructions to estimate a required higher order simulation result having a desired confidence interval for the reduced order simulated item using the shared self-refining surrogate model. In addition, the storage medium has instructions to determine whether the required higher order simulation result having the desired confidence interval for the reduced order simulated item is in the shared self-refining surrogate model.

If it is determined not, the storage medium has instructions to perform the higher order simulation to obtain the required higher order simulation result having the desired confidence interval for the reduced order simulated item. Also, the storage medium has instructions to enrich the shared self-refining surrogate model with the obtained higher order simulation result and to send the obtained higher order simulation result to the reduced order engineering simulation model. If it is determined so, the storage medium has instructions to obtain the required higher order simulation result having the desired confidence interval from the shared self-refining surrogate model and to send the obtained higher order simulation result to the reduced order engineering simulation model.

According to yet another aspect of the present invention, a system for collaborative building a shared self-refining surrogate model for engineering simulations in a computer network includes multiple client devices and a remote server coupled to the multiple client devices via the computer network. The remote server includes a processor and memory. The memory includes a unified service module and a shared self-refining surrogate model.

The multiple client devices run reduced order engineering simulation models on a complex system to simulate one or more simulation items in the complex system. Further, one of the multiple client devices sends a request to the unified service module via the computer network to estimate a higher order simulation for a reduced order simulation item. The unified service module then queries the shared self-refining surrogate model upon receiving the request for the higher order simulation for the reduced order simulated item.

The unified service module then estimates a required higher order simulation result having a desired confidence interval for the reduced order simulated item using the shared self-refining surrogate model. If the required higher order simulated item is not in the shared self-refining surrogate model, the unified service module performs the higher order simulation to obtain the required higher order simulation result having the desired confidence interval for the reduced order simulated item. In addition, the unified service module enriches the shared self-refining surrogate model with the obtained higher order simulation result. Moreover, the unified service module sends the obtained higher order simulation result to one of the reduced order engineering simulation model running on the one of the multiple client devices.

The methods, systems and apparatuses disclosed herein may be implemented in any means for achieving various aspects, and other features will be apparent from the accompanying drawings and from the detailed description that follow.

BRIEF DESCRIPTION OF THE DRAWINGS

Various preferred embodiments are described herein with reference to the drawings, wherein.

The drawings described herein are for illustration purposes only and are not intended to limit the scope of the present disclosure in any way.

DETAILED DESCRIPTION

A system and method for collaborative building of a surrogate model for engineering simulations in a networked environment is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The terms "computer network", "Intranet" and "Extranet" are interchangeably used throughout the document. In the document, the term "unified network service" refers to a service that is unified in a way that is available and used by everyone over a network (i.e., it refers to a service oriented architecture).

Figure 1:
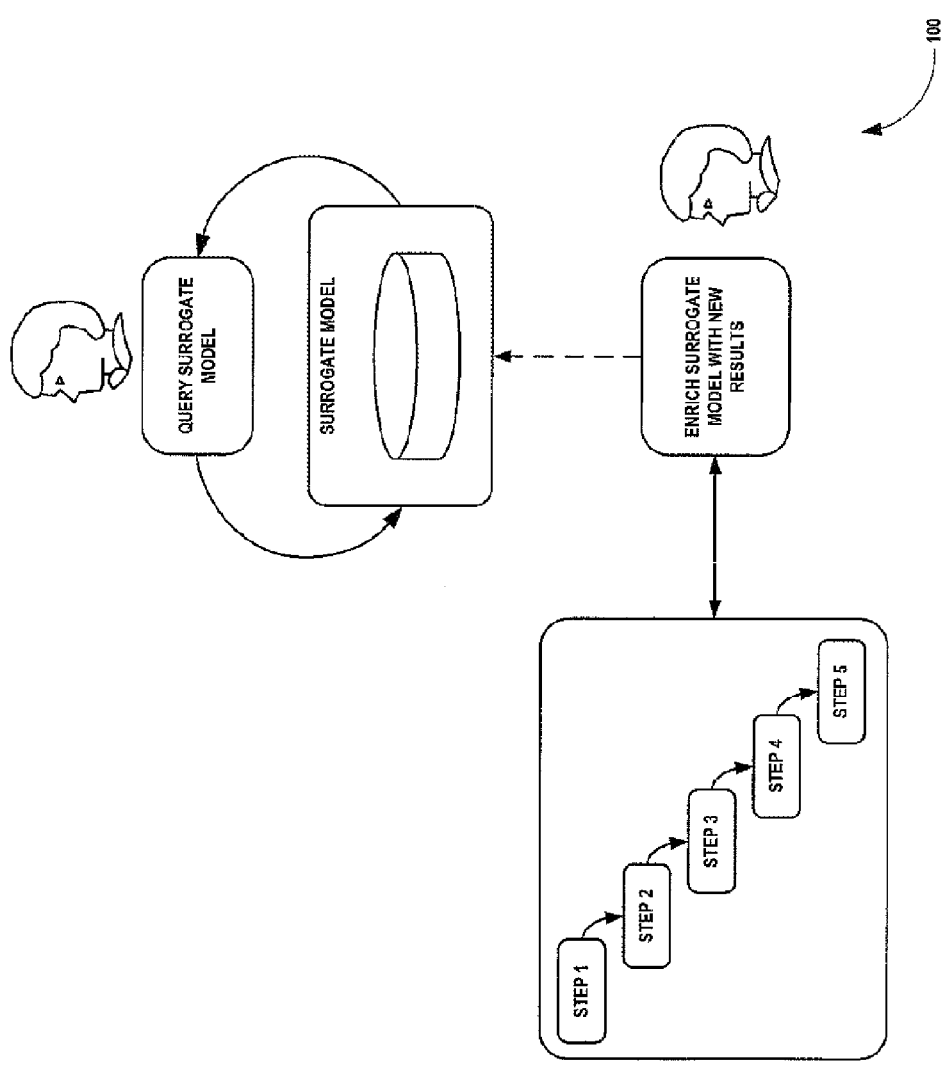
FIG. 1 illustrates a schematic diagram of a current surrogate model used in engineering simulations in the context of the invention.
Figure 2:
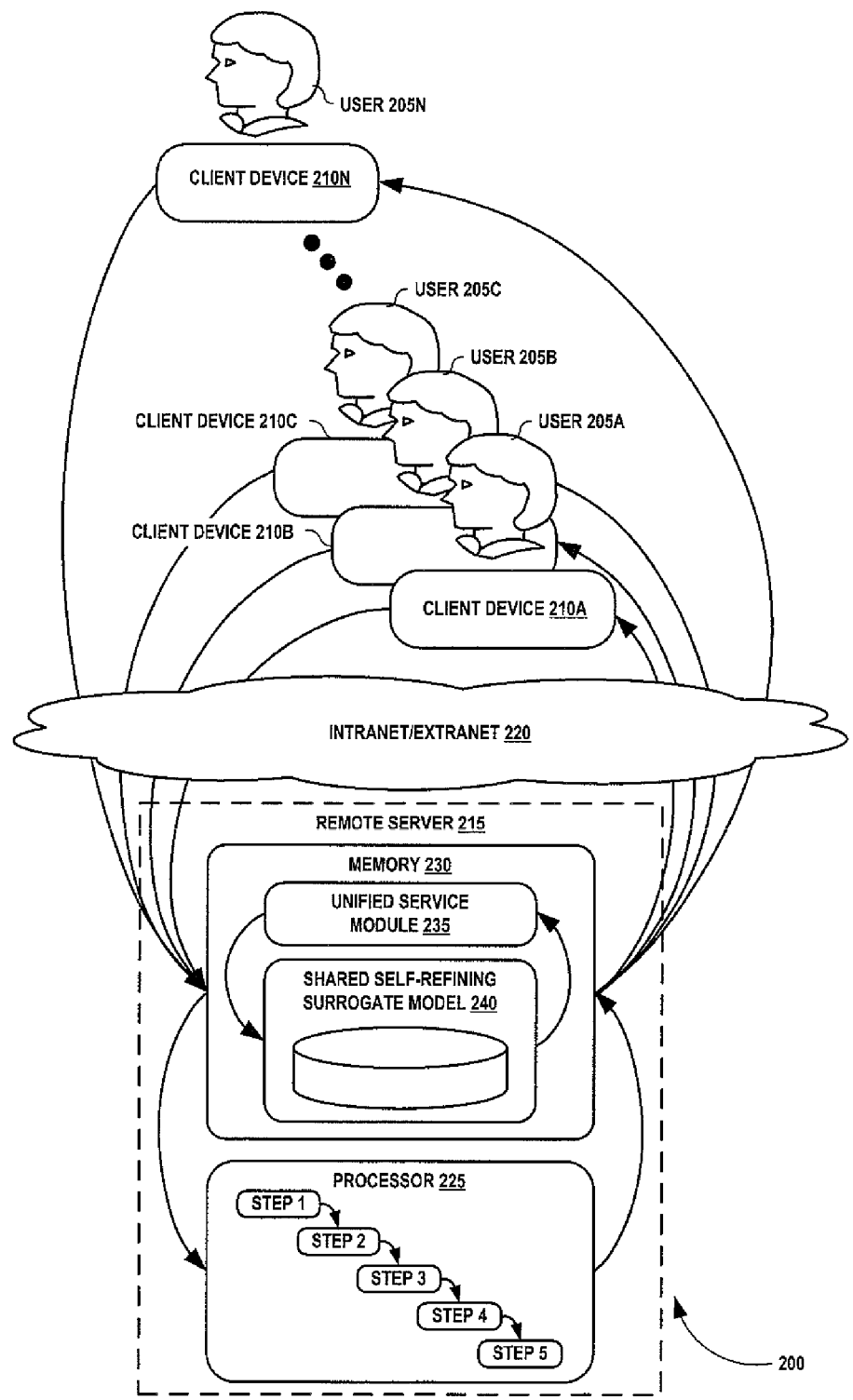
FIG. 2 illustrates a schematic diagram of a shared self-refining surrogate model used for engineering simulations in a unified network service or networked environment, according to an embodiment of the invention.

FIG. 2 illustrates a schematic diagram 200 of a shared self-refining surrogate model 240 used for engineering simulations in a unified network service or networked environment, according to an embodiment of the invention. Particularly, FIG. 2 illustrates the unified network service or networked environment which includes multiple client devices 210A-N and a remote server 215 coupled to the multiple client devices 210A-N via an Intranet/Extranet 220 (e.g., a computer network). As illustrated, each of the multiple client devices 210A-N is associated with users 205A-N. The remote server 215 includes a processor 225 and memory 230. The memory 230 includes a unified service module 235 and the shared self-refining surrogate model 240.

In operation, each of the users 205A-N runs different reduced order engineering simulation models on a complex system on each of the multiple client devices 210A-N to simulate one or more simulation items in the complex system. For example, the complex system may include a manageable network of aircraft components including but not limited to an aircraft fuel system, fluid pipings, ventilation, electric power systems and electronic systems.

During running the different reduced order engineering simulation models, one of the reduced order engineering simulation models running on one of the multiple client devices 210A-N may send a request to the unified service module 235 via the Intranet/Extranet 220 for estimating a higher order simulation for a reduced order simulated item. In one exemplary implementation, the one of the reduced order engineering simulation models sends the request to the unified service module 235 if the reduced order simulated item requires the higher order simulation. In such a scenario, the unified service module 235 queries the shared self-refining surrogate model 240 based on the request for the higher order simulation. Further, the unified service module 235 estimates a required higher order simulation result having a desired confidence interval for the reduced order simulated item using the shared self-refining surrogate model 240.

Furthermore, the unified service module 235 determines whether the required higher order simulation result having the desired confidence interval is in the shared self-refining surrogate model 240. If the required higher order simulation result is not in the shared self-refining surrogate model 240, the unified service module 235 performs the higher order simulation for the reduced order simulated item using the processor 225. Thus, the unified service module 235 obtains the higher order simulation result having the desired confidence interval by performing the higher order simulation for the reduced order simulated item.

In some embodiments, the processor 225 performs the higher order simulation to compute the required higher order simulation result having the desired confidence interval for the reduced order simulated item. In these embodiments, the processor 225 performs the steps (e.g., step 1, step 2, step 3, step 4 and step 5 as shown in FIG. 2) to compute the required higher order simulation result having the desired confidence interval. Exemplary steps performed by the processor 225 may typically include an automated use of computer-aided design (CAD) template, automated mesh generation, automated computational fluid dynamics (CFD) run, automated CFD post-processing and automated fill of output text file.

In addition, the unified service module 235 enriches the shared self-refining surrogate model 240 with the obtained higher order simulation result having the desired confidence interval for the reduced order simulated item. Thus, the unified service module 235 facilitates self-refining and collaboratively building of the shared self-refining surrogate model 240 based on requests for a higher order simulation received from the users 205A-N (i.e., based on business needs). Also, the unified service module 235 sends the obtained higher order simulation result for the reduced order simulated item to the one of the reduced order engineering simulation models running on the one of the multiple client devices 210A-N, via the Intranet/Extranet 220.

Alternatively, if the required higher order simulation result is in the shared self-refining surrogate model 240, the unified service module 235 obtains the required higher order simulation result having the desired confidence interval for the reduced order simulated item from the shared self-refining surrogate model 240. The unified service module 235 then answers back sending the obtained higher order simulation result to the one of the reduced order engineering simulation models running on the one of the multiple client devices 210A-N that initiated the request, via the Intranet/Extranet 220.

It can be noted that, if none of the one or more simulated items in the complex system require a higher order simulation, then the one of the multiple client devices 210A-N continues running the one of the reduced order engineering simulation model on the complex system.

For example, consider that the user 205A of the users 205A-N runs a one dimensional (1D) fuel simulation model on an aircraft fuel system on the client device 210A, where the aircraft fuel system includes one or more T-junctions having varying flow conditions, geometrical configurations and so on. Also, consider that, while running the 1D fuel simulation model, one of the T-junctions requires a three dimensional (3D) simulation. In such a scenario, the 1D fuel simulation model on the client device 210A requests, via the Intranet/Extranet 220, the unified service module 235 to estimate the 3D simulation for the 1D simulated T-junction.

The unified service module 235 running on the remote server 215 then queries the shared self-refining surrogate model 240 upon receiving the request for the 3D simulation for the 1D simulated T-junction. Subsequently, the unified service module 235 estimates a required 3D simulation result having a desired confidence interval for the 1D simulated T-junction using the shared self refining surrogate model 240. Further, if the shared self-refining surrogate model 240 does not have the required 3D simulation result having the desired confidence interval, the unified service module 235 performs the 3D simulation for the reduced order simulated item using the processor 225. Thus, the unified service module 235 obtains the required 3D simulation result having the desired confidence interval for the 1D simulated T-junction using the processor 225.

Furthermore, the unified service module 235 enriches the shared self-refining surrogate model 240 with the obtained 3D simulation result having the desired confidence interval for the 1D simulated T-junction. In addition, the unified service module 235 sends back, from the remote server 215 where it is running, to the requesting client device 210A via the Intranet/Extranet 220, the obtained 3D simulation result to be used in the 1D fuel simulation model the client device 210A. The 1D fuel simulation then continues on the client device 210A.

In another instance, consider that one of the users 205B-N runs a 1D fuel simulation model on the same aircraft fuel system for simulating a T-junction having different geometrical configuration than a previous one, on one of the client devices 210B-N. Also, consider that, while running the 1D fuel simulation model, the 1D simulated T-junction requires performing a 3D simulation and a required 3D simulation result having a desired confidence interval for the 1D simulated T-junction is not in the shared self-refining surrogate model 240. In such a scenario, the unified service module 235 obtains the required 3D simulation result having the desired confidence interval for the 1D simulated T-junction by performing the 3D simulation using the processor 225.

Further, the unified service module 235 enriches the shared self-refining surrogate model 240 using the obtained 3D simulation result having the desired confidence interval for the 1D simulated T-junction. The unified service module also sends the 3D simulation result, to be used in the 1D fuel simulation model running on the one of the client devices 210B-N, to the one of the client devices 210B-N via the Intranet/Extranet 220. Thus, the above-described technique enables collaborative building of the shared self-refining surrogate model 240 in the networked environment on an as need basis.

In yet another instance, consider that, one of the users 205B-N, running the 1D fuel simulation model on the same aircraft fuel system, requests for a 3D simulation estimate of a 1D simulated T-junction. Also, consider that the requested 3D simulation estimate has already been requested by another user (e.g., the user 205A) and a 3D simulation result having a desired confidence interval for the 1D simulated T-junction is in the shared self-refining surrogate model 240. In such a scenario, the unified service module 235 obtains the required 3D simulation result having the desired confidence interval from the shared self-refining surrogate model 240. Further, the unified service module 235 sends the obtained 3D simulation result for the 1D simulated T-junction, to be used in the 1D fuel simulation model, to the one of the client devices 210B-N via the Intranet/Extranet 220. Hence, there is no need to re-compute and redo the 3D simulation for the 1D simulated T-junction each time due to the sharing nature of the shared self-refining surrogate model 240.

In yet a further instance, consider that, one of the users 205B-N, running the 1D fuel simulation model on the same aircraft fuel system, requests for a 3D simulation of a 1D simulated T-junction. Further, consider that the requested 3D simulation for the 1D simulated T-junction has already been requested by another user (e.g., the user 205A) and a 3D simulation result for the 1D simulated T-junction is in the shared self-refining surrogate model 240. However, the 3D simulation result in the shared self-refining surrogate model 240 is not having a desired confidence interval required for the 1D simulated T-junction. In such a scenario, the unified service module 235 obtains a required 3D simulation result having the desired confidence interval for the 1D simulated T-junction.

Further, the unified service module 235 enriches (e.g., self refines) the shared self-refining surrogate model 240 using the obtained 3D simulation result having the desired confidence interval for the 1D simulated T-junction. Also, the unified service module 235 sends back the obtained 3D simulation result, to be used in the 1D fuel simulation model, to the one of the client devices 210B-N via the Intranet/Extranet 220. Thus, the shared self-refining surrogate model 240 is self-refined using more precise 3D simulation result until a "guaranteed" level of precision is reached. As a result, the number of computations required to build the shared self-refining surrogate model 240 is significantly reduced.

Figure 3:
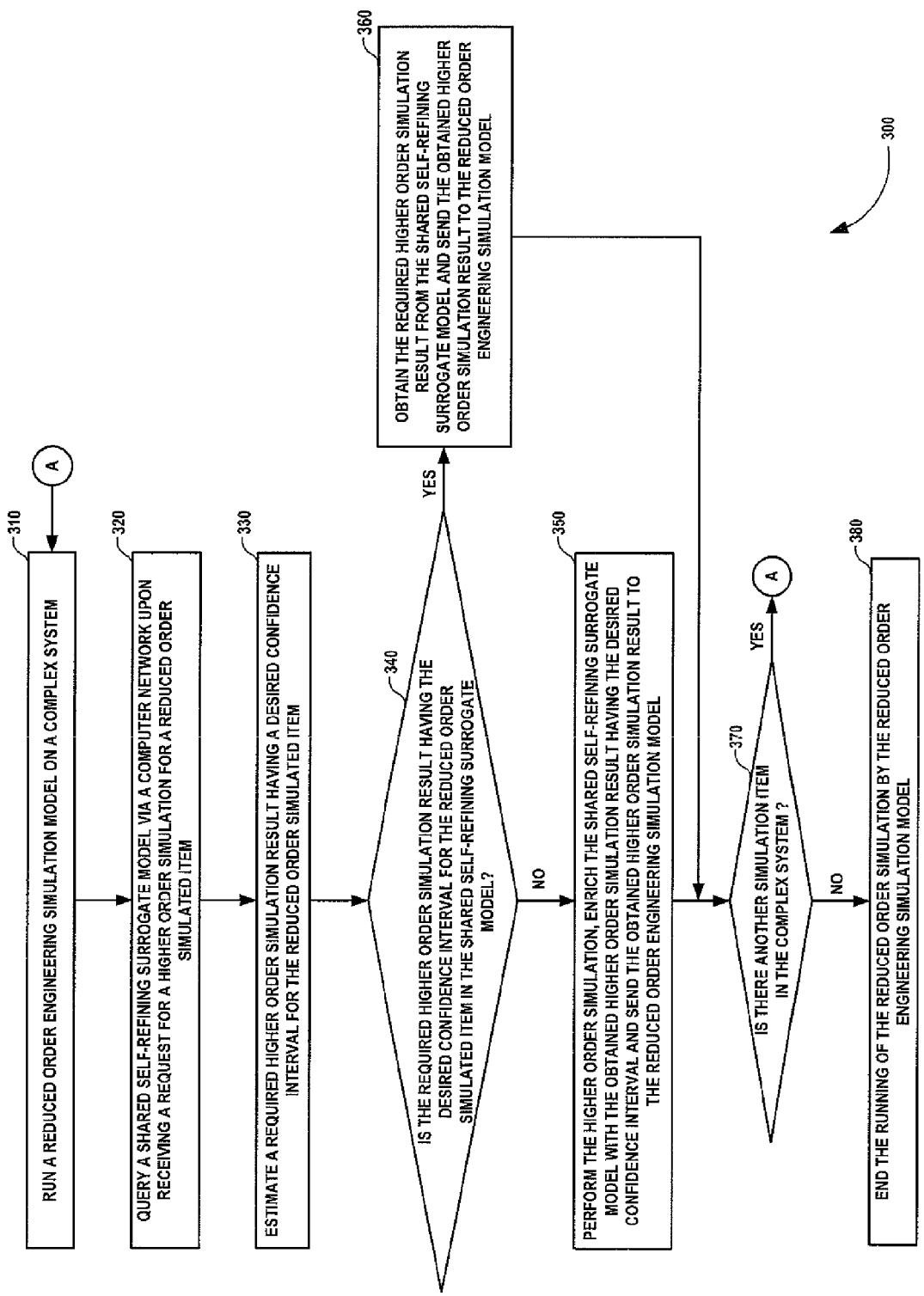
FIG. 3 illustrates a process flowchart of an exemplary method of collaborative building a shared self-refining surrogate model for engineering simulations in a networked environment, according to an embodiment of the invention.

FIG. 3 illustrates a process flowchart of an exemplary method 300 of collaborative building a shared self-refining surrogate model for engineering simulations in a networked environment or unified network service, according to an embodiment of the invention. In step 310, a reduced order engineering simulation model is run on a complex system to simulate one or more simulation items in the complex system by a user on a client device connected to a computer network. For example, the complex system may include a manageable network of aircraft components including but not limited to an aircraft fuel system, fluid pipings, ventilation, electric power systems, and electronic systems.

In step 320, a shared self-refining surrogate model is queried via the computer network upon receiving a request for a higher order simulation for a reduced order simulated item. It can be noted that, if one or more simulated items in the complex system does not require a higher order simulation, then the running the reduced order engineering simulation model on the complex system is continued. In step 330, a required higher order simulation result having a desired confidence interval for the reduced order simulated item is estimated using the shared self-refining surrogate model.

In step 340, it is determined whether the required higher order simulation result having the desired confidence interval for the reduced order simulated item is in the shared self-refining surrogate model. If it is determined not, then step 350 is performed, else step 360 is performed. In step 350, the higher order simulation is performed to obtain the required higher order simulation result having the desired confidence interval for the reduced order simulated item. Further, in step 350, the shared self-refining surrogate model is enriched with the obtained higher order simulation result having the desired confidence interval for the reduced order simulated item. Furthermore, in step 350, the obtained higher order simulation result for the reduced order simulated item is sent to the reduced order engineering simulation model and the method 300 continues at step 370.

In step 360, the required higher order simulation result having the desired confidence interval for the reduced order simulated item is obtained from the shared self-refining surrogate model. Further, in step 360, the obtained higher order simulation result having the desired confidence interval for the reduced order simulated item is sent to a reduced order engineering simulation model and step 370 is performed. In step 370, it is determined whether there is another simulation item in the complex system. If it is determined so, the method 300 is routed back to step 310 and performs steps 310 through 370 for a next reduced order simulation item, else the method 300 is ended in step 380.

Figure 4:
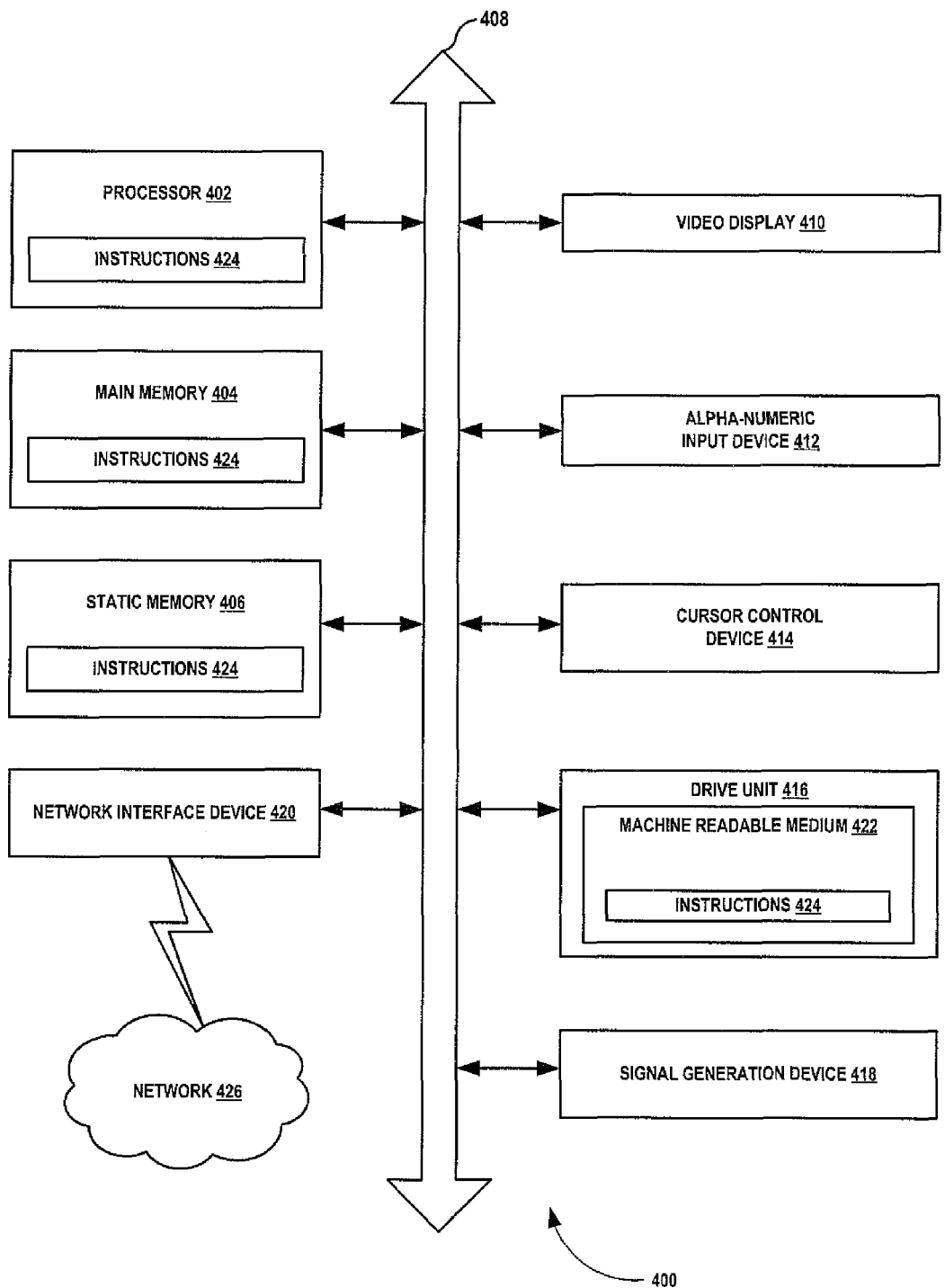
FIG. 4 illustrates a diagrammatic system view of a data processing system in which any of the embodiments disclosed herein may be performed, according to an embodiment of the invention.

FIG. 4 illustrates a diagrammatic system view 400 of a data processing system in which any of the embodiments disclosed herein may be performed, according to an embodiment of the invention. Particularly, the diagrammatic system view of FIG. 4 illustrates a processor 402, a main memory 404, a static memory 406, a bus 408, a video display 410, an alpha-numeric input device 412, a cursor control device 414, a drive unit 416, a signal generation device 418, a network interface device 420, a machine readable medium 422, instructions 424, and a network 426.

The diagrammatic system view 400 may indicate a personal computer and/or a data processing system in which one or more operations disclosed herein are performed. The processor 402 may be a microprocessor, a state machine, an application specific integrated circuit, a field programmable gate array, etc. The main memory 404 may be a dynamic random access memory and/or a primary memory of a computer system. The static memory 406 may be a hard drive, a flash drive, and/or other memory information associated with the data processing system.

The bus 408 may be an interconnection between various circuits and/or structures of the data processing system. The video display 410 may provide graphical representation of information on the data processing system. The alpha-numeric input device 412 may be a keypad, keyboard and/or any other input device of text (e.g., a special device to aid the physically handicapped). The cursor control device 414 may be a pointing device such as a mouse. The drive unit 416 may be a hard drive, a storage system, and/or other longer term storage subsystem.

The signal generation device 418 may be a BIOS and/or a functional operating system of the data processing system. The network interface device 420 may perform interface functions (e.g., code conversion, protocol conversion, and/or buffering) required for communications to and from the network 426 between a number of independent devices (e.g., of varying protocols). The machine readable medium 422 may provide instructions on which any of the methods disclosed herein may be performed. The instructions 424 may provide source code and/or data code to the processor 402 to enable any one or more operations disclosed herein.

For example, a storage medium having instructions, that when executed by a computing platform, result in execution of a method for collaborative building a shared self-refining surrogate model (e.g., the shared self-refining surrogate model 240 of FIG. 2) for engineering simulations in a computer network (e.g., the Intranet/Extranet 220 of FIG. 2). The storage medium has instructions to run a reduced order engineering simulation model on a complex system to simulate one or more simulation items in the complex system by a user (e.g., one of the users 205A-N of FIG. 2) on a client device (e.g., one of the multiple client devices 210A-N of FIG. 2) connected to the computer network. For example, the complex system may include a manageable network of aircraft components (e.g., an aircraft fuel system, fluid pipings, ventilation, electrical power systems, and electronic systems).

Further, the storage medium has instructions to query the shared self-refining surrogate model via the computer network upon receiving a request for a higher order simulation for a reduced order simulated item. The storage medium also has instructions to estimate a required higher order simulation result having a desired confidence interval for the reduced order simulated item using the shared self-refining surrogate model. In addition, the storage medium has instructions to determine whether the required higher order simulation result having the desired confidence interval for the reduced order simulated item is in the shared self-refining surrogate model.

If it is determined not, the storage medium has instructions to perform the higher order simulation to obtain the required higher order simulation result having the desired confidence interval for the reduced order simulated item. Also, the storage medium has instructions to enrich the shared self-refining surrogate model with the obtained higher order simulation result, and to send the obtained higher order simulation result to the reduced order engineering simulation model. If it is determined so, the storage medium has instructions to obtain the required higher order simulation result having the desired confidence interval from the shared self-refining surrogate model and to send the obtained higher order simulation result to the reduced order engineering simulation model.

In addition, the storage medium has instructions to determine whether there is another simulation item in the complex system. If it is determined so, the storage medium has instructions to repeat the steps of running, querying, estimating, determining, performing, enriching, and sending for a next reduced order simulation item in the complex system. If it is determined not, the storage medium has instructions to end the running of the reduced order simulation by the reduced order engineering simulation model. Moreover, the storage medium has instructions to continue running the reduced order engineering simulation model on the complex system if the one or more simulated items in the complex system does not require a higher order simulation.

The above-described technique introduces a shared self-refining surrogate model between requests from users and detailed computation. In one embodiment, the above described technique centralizes requests from users to achieve collaborative building of the shared self-refining surrogate model and also provides a centralized access to the shared self refining surrogate model. Further, in the above-described technique, the users can use and refine the shared self-refining surrogate model over a computer network. Furthermore, the above-described technique enables initialization of the shared self-refining surrogate model with minimal design of experiments.

Moreover, the above-described technique provides the shared self-refining surrogate model for better mathematical formulation of interpolation between a set of existing points and good estimation of interpolation error. Also, the above-described technique automatically runs additional computation(s) to complete data sets until precision of interpolation reach a "guaranteed" level of precision.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method for collaborative building a shared self-refining surrogate model for engineering simulations in a computer network, comprising:
   receiving, by a unified service module of a remote server via the computer network, a request for a higher order simulation of a reduced order simulation item from a reduced order engineering simulation model running on a client device, wherein the client device runs the reduced order engineering simulation model to simulate one or more simulation items of a complex system, wherein the higher order simulation is a three dimensional (3D) simulation and the reduced order simulation item is a one dimensional (1D) simulated element;
   determining, by the unified service module, whether a required higher order simulation result, within a confidence interval required for the reduced order simulation item, is in the shared self-refining surrogate model residing in the remote server, wherein the shared self-refining surrogate model comprises previously performed higher order simulations and results associated with the previously performed higher order simulations; and
   if not, performing the higher order simulation to obtain the required higher order simulation result within the confidence interval required for the reduced order simulation item by the unified service module, enriching the shared self-refining surrogate model with the obtained higher order simulation result by the unified service module, and sending the obtained higher order simulation result to the reduced order engineering simulation model via the computer network by the unified service module.

2. The method of claim 1, further comprising:
   if so, obtaining the required higher order simulation result within the confidence interval required for the reduced order simulation item from the shared self-refining surrogate model by the unified service module, and sending the obtained higher order simulation result to the reduced order engineering simulation model via the computer network by the unified service module.

3. The method of claim 1, further comprising:
   determining whether there is another simulation item of the complex system;
   if so, repeating the steps of running, querying, estimating, determining, performing, enriching, and sending for a next reduced order simulation item of the complex system; and
   if not, ending the running of the reduced order simulation by the reduced order engineering simulation model.

4. The method of claim 1, further comprising:
   if the one or more simulation items of the complex system does not require a higher order simulation, then continuing running the reduced order engineering simulation model of the complex system.

5. The method of claim 1, wherein the complex system comprises:
   a manageable network of aircraft components, wherein the manageable network of aircraft components is selected from the group consisting of aircraft fuel system, fluid pipings, ventilation, electrical power systems, and electronic systems.

6. The method of claim 1, wherein the 1D simulate element comprises a 1D simulated T-junction.

7. The method of claim 1, wherein the reduced order engineering simulation model comprises a 1D fuel simulation model.

8. An article, comprising:
   a non-transitory storage medium having instructions, that when executed by a computing platform, result in execution of a method for collaborative building a shared self-refining surrogate model for engineering simulations in a computer network, comprising:
   receiving, by a unified service module of a remote server via the computer network, a request for a higher order simulation of a reduced order simulation item from a reduced order engineering simulation model running on a client device, wherein the client device runs the reduced order engineering simulation model to simulate one or more simulation items of a complex system, wherein the higher order simulation is a three dimensional (3D) simulation and the reduced order simulation item is a one dimensional (1D) simulated element;
   determining, by the unified service module, whether a required higher order simulation result, within a confidence interval required for the reduced order simulation item, is in the shared self-refining surrogate model residing in the remote server, wherein the shared self-refining surrogate model comprises previously performed higher order simulations and results associated with the previously performed higher order simulations; and
   if not, performing the higher order simulation to obtain the required higher order simulation result within the confidence interval required for the reduced order simulation item by the unified service module, enriching the shared self-refining surrogate model with the obtained higher order simulation result by the unified service module, and sending the obtained higher order simulation result to the reduced order engineering simulation model via the computer network by the unified service module.

9. The article of claim 8, further comprising:
if so, obtaining the required higher order simulation result within the confidence interval required for the reduced order simulation item from the shared self-refining surrogate model by the unified service module, and sending the obtained higher order simulation result to the reduced order engineering simulation model via the computer network by the unified service module.

10. The article of claim 8, further comprising:
determining whether there is another simulation item of the complex system;
if so, repeating the steps of running, querying, estimating, determining, performing, enriching, and sending for a next reduced order simulation item of the complex system; and
if not, ending the running of the reduced order simulation by the reduced order engineering simulation model.

11. The article of claim 8, wherein the complex system comprises:
a manageable network of aircraft components, wherein the manageable network of aircraft components is selected from the group consisting of aircraft fuel system, fluid pipings, ventilation, electrical power systems, and electronic systems.

12. The article of claim 8, wherein the 1D simulated element comprises a 1D simulated T-junction.

13. A system for collaborative building a shared self-refining surrogate model for engineering simulations in a computer network, comprising:
multiple client devices; and
a remote server coupled to the multiple client devices via the computer network, wherein the remote server comprises:
a processor; and
memory, wherein the memory includes a unified service module and a shared self-refining surrogate model, wherein the shared self-refining surrogate model comprises previously performed higher order simulations and results associated with the previously performed higher order simulations, wherein the multiple client devices run reduced order engineering simulation models to simulate one or more simulation items of a complex system, wherein one of the multiple client devices sends a request to the unified service module via the computer network for estimating a higher order simulation of a reduced order simulation item, wherein the higher order simulation is a three dimensional (3D) simulation and the reduced order simulation item is a one dimensional (1D) simulated element, and wherein the unified service module performs the higher order simulation to obtain a required higher order simulation result, within a confidence interval required for the reduced order simulation item, enriches the shared self-refining surrogate model with the obtained higher order simulation result, and sends the obtained higher order simulation result to one of the reduced order engineering simulation models running on the one of the multiple client devices via the computer network if the required higher order simulation item is not in the shared self-refining surrogate model.

14. The system of claim 13, wherein the unified service module obtains the required higher order simulation result within the confidence interval required for the reduced order simulation item from the shared self-refining surrogate model, and sends the obtained higher order simulation result to one of the reduced order engineering simulation models running on the one of the multiple client devices if the required higher order simulation item is in the shared self-refining surrogate model via the computer network.

15. The system of claim 13, wherein the one of the multiple client devices continues running one of the reduced order engineering simulation model of the complex system if none of the one or more simulation items require a higher order simulation.

16. The system of claim 13, wherein the complex system comprises:
a manageable network of aircraft components, wherein the manageable network of aircraft components is selected from the group consisting of aircraft fuel system, fluid pipings, ventilation with, electrical power systems, and electronic systems.

17. The system of claim 13, wherein the 1D simulated element comprises a 1D simulated T-junction.

* * * * *